(12) United States Patent
Tarapaski

(10) Patent No.: US 9,404,232 B2
(45) Date of Patent: Aug. 2, 2016

(54) APPARATUS AND METHOD FOR CHANNELLING GROUNDWATER

(76) Inventor: William E. Tarapaski, Bangkok (TH)

( * ) Notice: Subject to any disclaimer, the term of this patent is extended or adjusted under 35 U.S.C. 154(b) by 183 days.

(21) Appl. No.: 14/237,325

(22) PCT Filed: Aug. 3, 2012

(86) PCT No.: PCT/IB2012/053996
§ 371 (c)(1),
(2), (4) Date: May 20, 2014

(87) PCT Pub. No.: WO2013/021333
PCT Pub. Date: Feb. 14, 2013

(65) Prior Publication Data
US 2014/0248084 A1 Sep. 4, 2014

(30) Foreign Application Priority Data
Aug. 5, 2011 (GB) .................................. 1113608.2

(51) Int. Cl.
*E02B 11/00* (2006.01)
*E02D 3/10* (2006.01)
*F16L 1/028* (2006.01)

(52) U.S. Cl.
CPC . *E02B 11/00* (2013.01); *E02D 3/10* (2013.01); *F16L 1/028* (2013.01)

(58) Field of Classification Search
CPC ......... E02B 11/00; E02B 11/005; E02D 3/10; E02D 31/02; E01C 11/227; E03F 5/101; F16L 1/028; A01G 25/06
See application file for complete search history.

(56) References Cited

U.S. PATENT DOCUMENTS

| | | | |
|---|---|---|---|
| 5,564,857 A | 10/1996 | Schluter | |
| 5,908,266 A | 6/1999 | Miller | |
| 5,934,828 A | 8/1999 | Hu et al. | |
| 6,095,718 A | 8/2000 | Bohnhoff | |
| 6,648,550 B1 * | 11/2003 | Parker | E02B 11/00 405/43 |
| 6,905,285 B2 | 6/2005 | Little et al. | |
| 7,264,418 B1 | 9/2007 | Houck | |

FOREIGN PATENT DOCUMENTS

| | | | | |
|---|---|---|---|---|
| JP | 58-138811 A | 8/1983 | | |
| JP | 59-80812 A | 5/1984 | | |
| JP | 59-134219 A | 8/1984 | | |
| JP | 4-83011 A | 3/1992 | | |
| KR | 10-0961174 B1 | 6/2010 | | |
| KR | 100961174 | * | 6/2010 | ............. E02B 11/00 |
| SU | 1074951 A | 2/1984 | | |

* cited by examiner

*Primary Examiner* — Sunil Singh
*Assistant Examiner* — Carib Oquendo
(74) *Attorney, Agent, or Firm* — Blank Rome LLP

(57) ABSTRACT

Embodiments described herein are related to water management units for extracting water from moist soil. The units extract water and collect it to be siphoned away as waste water or for later use. A water management unit comprising: an elongate collection portion; and an extraction portion arranged to discharge extracted water into the collection portion, wherein the extraction portion comprises at least one rib extending laterally from the collection portion along a length of the collection portion. Water is collected by capillary action.

15 Claims, 14 Drawing Sheets

APPARATUS AND METHOD FOR CHANNELLING GROUNDWATER

BACKGROUND OF THE INVENTION

1. Field of the Invention

The present invention relates to an apparatus and method for collecting and channeling ground water, and more particularly, to a unit for water management that combines an extraction unit to absorb liquid from the ground, a method to transfer the liquid into a conduit, and a conduit system to carry the water away, without the need for separate components. The apparatus may be used for drainage or as an irrigation system.

2. Description of Related Art

Conventionally, most drainage systems used for water management for example on farms, sports fields, golf courses, civil engineering projects such as tunnels, road beds and retaining walls are primarily comprised of permeable drain pipes which have a number of small openings or pores distributed over the upper portion of the pipe so that water may enter through the upper portion and collect in the lower portion of the pipe. However, such systems are prone to becoming clogged with soil particles and the collection capability quickly becomes reduced. Various additions such as filters have been tried to prevent soil from entering the pipe. However, clogging still tends to occur.

To overcome this, a drain belt was developed as disclosed in U.S. Pat. No. 5,934,828 and sold as Capiphon drain belt. The drain belt is an efficient method for ground water collection without transferring soil particles into the drainage system. Thus, the drain belt does not become clogged and the collection capacity is not reduced over time. Further, the system does not require maintenance to de-clog pipes.

Such a drain belt 10 is shown schematically in FIG. 1. The surface of the belt 10 has a plurality of parallel slots 12 of generally rectangular cross-section which extend along the length of the belt 10. Each slot 12 communicates with a corresponding notch or channel 11 of generally circular cross-section forming, in combination, key-hole shaped cross-section extending along the length of the belt 10 and into the interior of the belt. The slots 12 and channels 11 are sized such that water is drawn into channels 11 via the slots 12 by capillary action so that it can be channelled along the length of the belt 10 and subsequently delivered into a pipe system to be drained away. When the belt 10 is installed in soil and the soil becomes saturated, water fills the spaces between the soil particles and also fills the channels of the drain belt 10 by capillary action.

FIG. 2a shows an end view of drain belt 10 in dry soil. Air fills the slots 12 and channels 11. FIG. 2b shows the drain belt 10 in saturated soil. Water fills the space between the soil particles and the slots 12 and channels 11. The water may flow along the channels 11 in the belt 10 to be discharged. The drain belt 10 construction means that water will be collected from any saturated soil in which it is installed.

FIG. 3 illustrates the collection area of a width of drain belt 10. As the water in the immediate vicinity of the drain belt moves into the channels 11 through the slots 12, and is removed, it is replaced with additional water moving in to fill the area vacated by the collected water. The speed of water movement towards the collection area is limited by the size of the pore spaces between the soil particles (hydraulic conductivity of the soil) and the pressure (head).

The efficiency of a drainage system is improved when the collection and discharge rate is greater than the ability of the soil to provide water for collection. The collection rate of drain belt can be increased or decreased by increasing or decreasing the length of the drain belt, since increasing the length provides a larger surface area for collection. Increasing the collection capacity is effective only if the additional water collected can flow through the channels 11 easily and can be discharged at the same rate as collection. The small size of the channels 11 create resistance to flow along the length of the belt, and since the drain belt must discharge through one end the drainage capacity is reduced to a small amount even though the collection capacity has been increased.

A functional drainage system requires efficient collection of the water, but also efficient transport of the water to the evacuation point. The small size of the channels 11 are not a practical transport mechanism for the collected water, and as such, the drain belt must be connected to a pipe network. The combination of the drain belt for water collection and the pipe network to transport the water, forms an effective drainage system, but is complicated, expensive, and prone to workmanship error.

Efficiency of the drainage system can be improved by increasing the frequency of drain belts, and thus, the frequency of discharge points, and by limiting the length of the drain belt so that the transport distance is short and the water is discharged into the pipe sooner. FIG. 4 shows a drainage system which can collect and discharge water rapidly, but is complicated and labor intensive to assemble and install. Both the pipe 20 and drain belts 10 must be sloped to drain by gravity, requiring extensive and careful excavation and backfilling. The areas surrounding the pipe 20 and drain belts 10 must be carefully hand compacted to prevent a U-bend joint so that water from the drain belt no longer discharges from the belt into the pipe. FIG. 5a shows, in cross section, a belt 10 joined to a pipe 20, arranged so that water may flow from the belt 10 into the pipe 20. FIG. 5b shows, in cross section, a joint where the surrounding ground has settled resulting in a U-bend preventing water from being discharged into the pipe 20.

Further, installing the drain belt in damp, wet, and muddy conditions has increased difficulties. A small amount of weight applied to the top surface can easily push the bottom surface into the soft earth and completely clog the slots 12 and channels 11, rendering the drain belt inoperative. Also, since the drain belt is installed in low areas where water collects, in trenches, the likelihood of foot traffic on the surface of the belt is unavoidable. Even installations over a layer of sand will display some obstructions in the slots 12 and channels 11.

As such, installation of a drain belt system is expensive because it requires careful supervision.

SUMMARY OF THE INVENTION

In one embodiment a water management unit comprising: an elongate collection portion; and an extraction portion arranged to discharge extracted water into the collection portion, wherein the extraction portion comprises at least one rib extending laterally from the collection portion along a length of the collection portion is disclosed.

In another embodiment, the water management unit further comprises a water extraction formation located on the underside of the at least one rib.

In another embodiment, the water extraction formation is arranged to extract water by capillary action.

In another embodiment, the capillary action method uses an array of rods. The array may be arranged in a number of layers, where the layers are rotated relative to each other. The rods may be directed or sloped towards a collection portion of the unit.

In another embodiment the extraction portions may be interrupted with each extraction sub-portion directing water into a collection portion. Adjacent extraction sub-portions may be substantially parallel to each other or they may have surfaces sloped in opposing directions.

In another embodiment, the extraction portion formation has a plurality of channels for water to flow along.

In another embodiment, the at least one rib extends along the length of the collection portion.

In another embodiment, the at least one rib slopes in a downward direction from an upstream end of the unit.

In another embodiment, the at least one rib slopes at an angle in the range of 2°-30°, more particularly in the range of 5°-20°, and preferably at approximately 15° relative to the collection portion.

In another embodiment, the rib has a triangular cross section where the upper surface is angled and the underside is approximately horizontal.

In another embodiment, the unit has a plurality of parallel ribs arranged on at least one side of the unit.

In another embodiment, the unit is rectangular and relatively narrow laterally in cross-section profile or the unit may be relatively low and broad in cross-section.

In another embodiment, the collection portion has dimensions in the range of height of 10-40 cm, a width of 5-15 cm and a length of 20-60 cm; and the ribs are 1-5 cm wide or the unit may be 3-4 cm in height with a width of approximately 50 cm.

In another embodiment, an upstream end of the unit is shaped to cooperate with a downstream end of a second unit.

In another embodiment, the upper surface of the unit is shaped to cooperate with the lower surface of a second unit.

In another embodiment, the unit may have a lid or cover. Alternatively, the unit may be covered with geotextile.

In another embodiment, the unit is adapted to connect to interlocking fittings of drainage systems.

In another embodiment, the unit is made from a semi-rigid material.

In another embodiment, the unit is made from plastic.

In another embodiment, the unit is manufactured in a moulding process as a single part.

In another embodiment, a water management system comprises at least one water management unit and a discharge pipe located downstream of the at least one unit is disclosed.

In another embodiment, the drainage system further comprises a plurality of connected units.

In another embodiment, the plurality of units are connected by vertically stacking.

In another embodiment, the plurality of units are connected horizontally with the upstream end of a first unit connected to the downstream end of a second unit.

In another embodiment, a method of installing a water management unit or water management system, wherein the water management unit is connected to a pipe network and placed in a trench and the trench is backfilled is disclosed.

Aspects of the invention are defined in the accompanying independent claims.

The invention meets a need for a drainage system which is effective, durable, simple to install, and has a large collection and discharge capacity, and can operate without a separate pipe network. Preferably this does not become clogged with debris during installation or during use, and does not require maintenance after installation.

BRIEF DESCRIPTION OF THE DRAWINGS

Embodiments of the present invention will now be described, by way of example only, with reference to the accompanying drawings in which like reference numerals are used to depict like parts. In the drawings.

DETAILED DESCRIPTION

Embodiments of the invention are now described with reference to the drawings.

Figure 11:
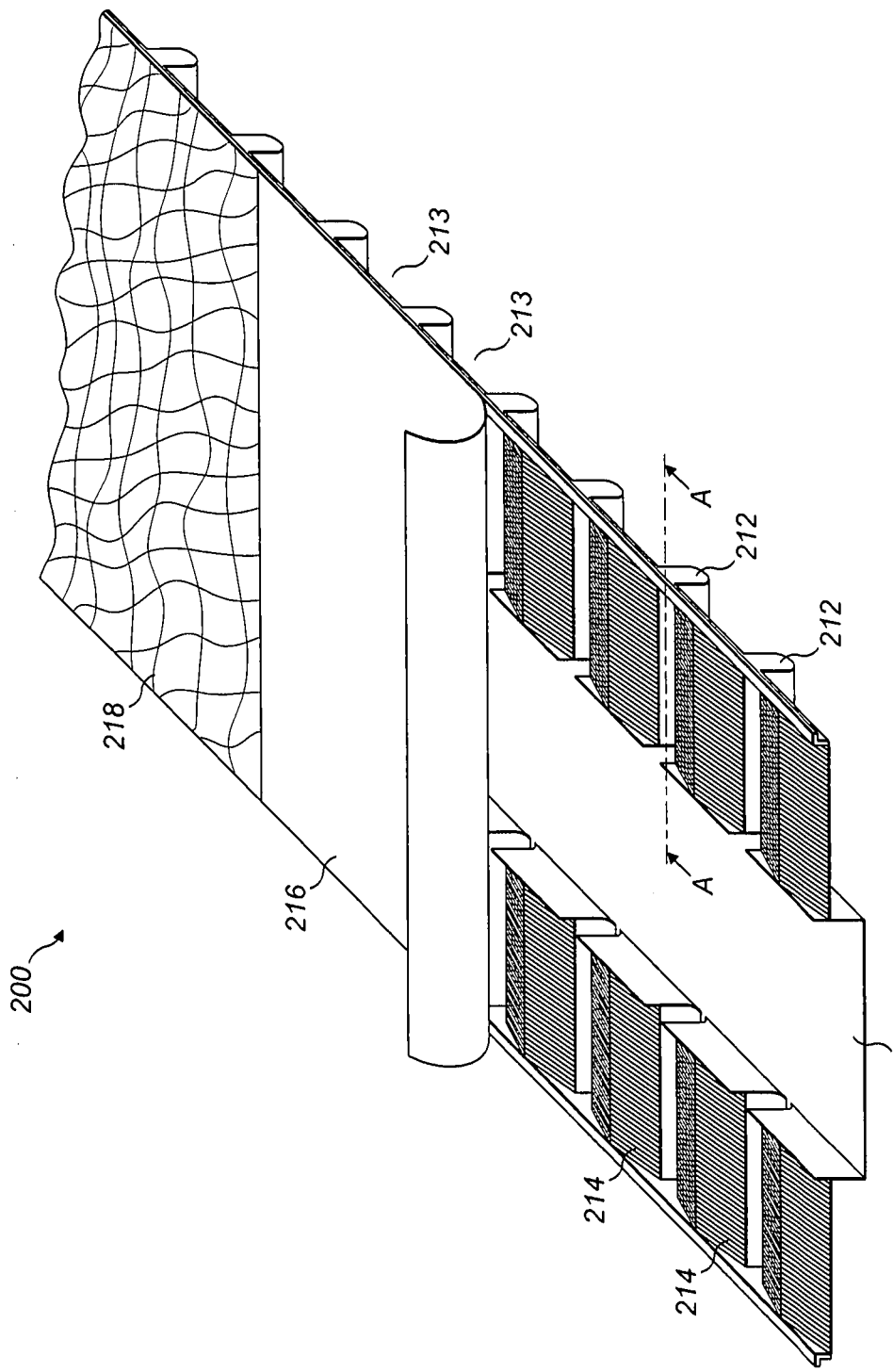
FIG. 11 shows a schematic diagram of a low profile water management unit.

An embodiment of the invention is shown in FIG. 11. The arrangement uses an alternative capillary action water collection method and the water management unit has a relatively broad and low or flat profile. The unit 200 has a main water flow channel 210, a number of collection portions 212 and a number of extraction portions or sub-portions 214. The extraction portions 214 comprise ribs extending from the main water flow channel 210. Water extraction material is located on the underside of the ribs. The collection portions 212 also extend from the main water flow channel 210 and are parallel and below the extraction portions 214 so that water may be deposited from the extraction portion 214 into the collection portion 212. The extraction portions 214 are sloped and are directed to deposit extracted water directly into the collection portions 212 which are located in the troughs between extraction portions. In the embodiment shown in FIG. 11, the extraction portions 214 form a peak between adjacent collection portions 212 such that the extraction portions 214 are sloping in two opposing directions relative to the length of the unit 200. In other embodiments the adjacent extraction sub-portions are substantially parallel. The extraction portions 214 are interrupted at intervals so that they discharge directly into collection portions 212, where extracted water has travelled only a short distance.

The unit 200 in the embodiment shown does not have a defined nor required upstream or downstream direction. This may be determined during installation of the unit 200 by the water flow direction in the main water flow channel 210. The collection portions 212 also provide supports for the unit 200, akin to feet, which may be directly placed in a trench during installation. More details of installation of water management units are given below in relation to other embodiments.

The collection portions 212 extend below the extraction portion 214. When placed in a trench, the collection portions or feet, ensure that the water management unit is supported and that the extraction portions 214 are raised. This helps to ensure that the extraction portions are clear from soil and soil is not extracted with water, which would clog the capillary extraction material. Having the water management unit raised by the collection portions 212 also allows water to follow to an area where it may be easily extracted from.

The unit 200 may be covered with a cover 216. The cover 216 may be made from a semi-rigid plastic material, or an equivalent material, which is welded to the main body of the extraction unit. Alternatively, the cover may be a snap fit cover. Alternatively, the unit may be covered by a geotextile material 218, suitable for use in conjunction with SubAir applications. The cover 216 or geotextile 218 assist in providing rigidity to the unit and also help to prevent soil from clogging the capillary collection structure of the extraction portions 214. The skilled person will be familiar with SubAir systems. A SubAir system allows for compressed air or gas to be inserted into the sub grade and defused through the top and bottom of the unit. Use of a geotextile cover allows for easier diffusion through the top of the unit, and less pressure is required when compared to using a perforated pipe arrangement.

The method of capillary action extraction of water used in the present embodiment is more effective than that previously described in relation to the prior art as it is not influenced by the resistance of water already in the extraction material.

Figure 18:
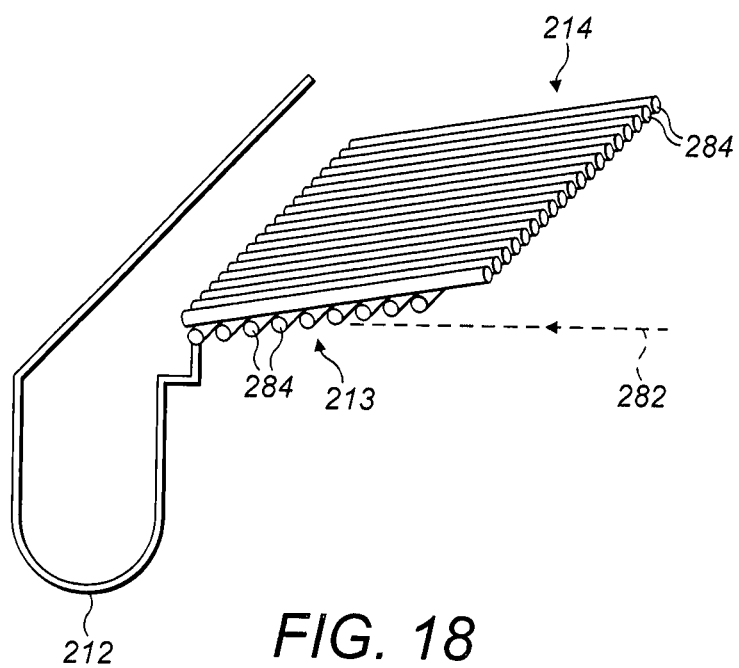
FIG. 18 shows a detailed view taken through section A-A of FIG. 11.
Figure 19:
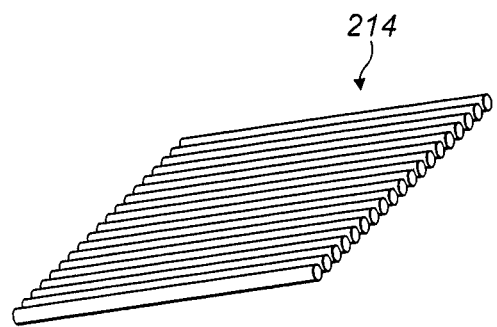
FIG. 19 shows a detailed view of capillary rods.

FIG. 18 shows a detailed view taken through section A-A of FIG. 11. The detail shows the extraction portion 214 and the collection portion 212. The extraction portion comprises an array of capillary rods 284 arranged in parallel as shown in FIG. 19. The rods may be fixed in layers by setting one end of the rods in resin, fixing in an open frame or otherwise holding the rods in place. In FIG. 18, two layers are shown where the direction of the rods are at 90° to each other. The upper layer of rods is directed towards the collection portion 212. In general, each layer of rods 284 should have a different orientation, for example rotated by 90° or 45°. Only one layer of rods is required, however, two or more layers provide additional benefits. As the water management unit is placed directly in the ground, the underside of the rods is exposed to the soil 213. Rising water in saturated soil, shown by the broken line 282, is taken up by the rods by capillary action.

Figure 20:
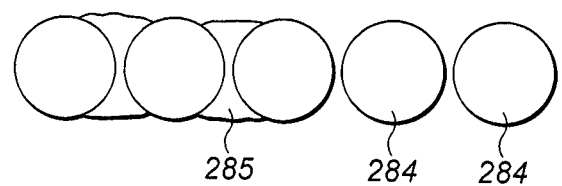
FIG. 20 shows a detailed view of capillary rods.
Figure 21:
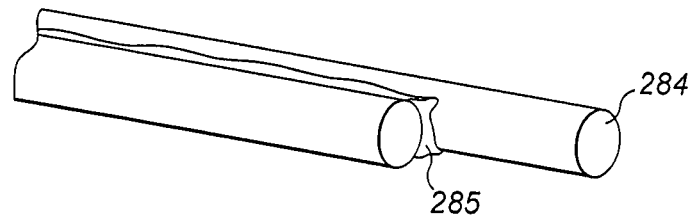
FIG. 21 shows a detailed view of capillary rods.

FIG. 20 shows an end view of the rods in detail. The rods 284 are spaced apart by a suitable distance such that water 285 is drawn up between the rods 284. Where the rods 284 are sloped water 285 may flow between the rods 284 as shown in FIG. 21. The flow of water is according to the slope of the rods 284 in the extraction portion 214. Thus, water may be extracted from the surrounding soil and deposited directly in the collection portion 212 of the water management unit.

The capillary collection method benefits where more than one layer of capillary rods are present. An increased number of layers provide an increased water capacity. Further, where a single layer is used, water may spurt through the capillary rods. A second layer helps to block this. Further, soil particles are less likely to enter the water management unit with an increased number of rod layers.

As each layer of rods will have draining capacity, it is preferable to direct each layer of the rods towards a collection portion. For example, two layers of rods may be arranged at 45° to the edge of the collection portion so that both layers are directed towards the collection portion.

The capillary extraction rods may be made from rigid plastic, heavy gauge copper wire or any other suitable material.

Referring again to FIG. 11, water is extracted from the soil in the gaps between the collection portions 212, and surrounding area. In this embodiment, once water has been extracted from the surrounding soil, it does not need to be transported through a long length of capillary channels. Water is quickly deposited in the larger channels of the collection portion 212 and the main water flow channel 210. Thus, the flow of water through the extraction portion 214 does not limit the water extraction capability of the unit 200. Water extraction is not affected by water already in the collection portions 212 or main water flow channel 210. The collected water may be removed by connecting the unit 200 or the main water flow channel 210 to a drainage system.

Figure 13:
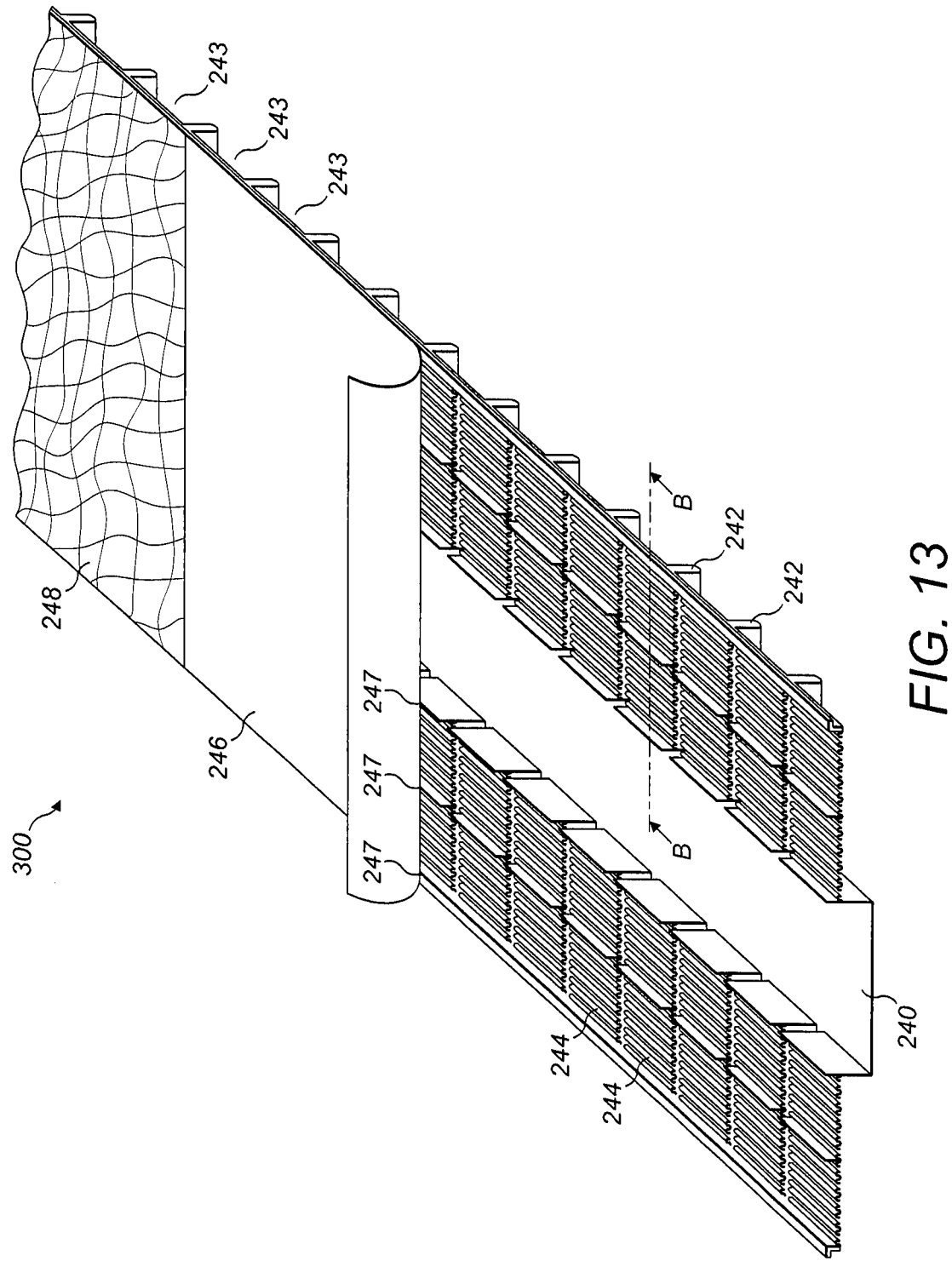
FIG. 13 shows a schematic diagram of a low profile water management unit.

The embodiment shown in FIG. 13 shows a similar arrangement to that of FIG. 11 where the water management unit has a relatively broad and flat profile. However, this embodiment uses a different capillary action collection method. The unit 300 has a main water flow channel 240, a number of collection portions 242 and a number of extraction portions 244. The extraction portions 244 form ribs extending from the main water flow channel 240. The collection portions 242 also extend from the main water flow channel 240 and are parallel with the extraction portions 244. In this embodiment, the extraction portions 244 are substantially horizontal as the extraction material does not require a slope to deposit water directly into the collection portions 242. The unit 300 may be covered with a cover 246 or geotextile 248. The cover 246 may be attached to the unit 300 at points 247. When installed, water is collected from the gaps 243 between the collection portion 242 and surrounding area. Again, the collection portions 242 may also provide supports for the unit 300. The unit may be placed directly in a trench during installation.

Figure 12:
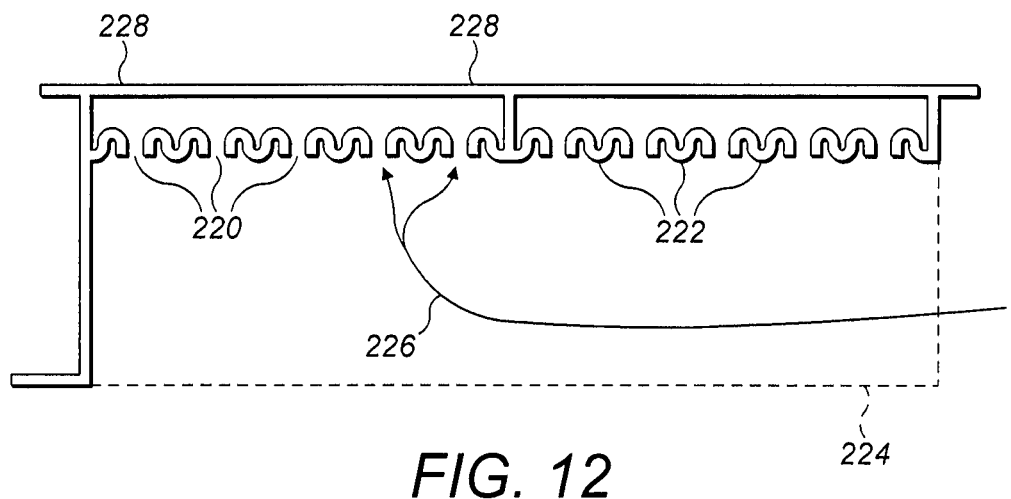
FIG. 12 shows a detailed cross-section view taken through section B-B of FIG. 13.

FIG. 12 shows the extraction portion 214 of FIG. 13 in more detail, taking a section through B-B of FIG. 13. The method of extraction is by capillary action. However, the arrangement is different to that previously described herein. In the present arrangement, water is extracted from the soil under the ribs through slots 220 between "m"-shaped mini-channels located on the bottom side of the ribs. A number of mini-channels are located along the width of the ribs with a gap between each of the channels. The slots 220, through which the water is extracted, are suitably sized for the water to enter the extraction portion 214 by capillary action. Extracted water is then deposited in the "U"-shaped bends 222 of the m-shaped mini-channel and the mini-channel to the collection portion 210 of the unit 200. The collection portion 212 of the unit is shown by the broken line 224 and is located at the end of the mini-channels. Thus, water may flow into the unit from the surroundings in a direction as indicated by arrow 226.

As can be seen in FIG. 12, the unit cover 228 is attached to the unit 200 on a number of supports located to the side of the "m"-shaped mini-channels.

Figure 14:
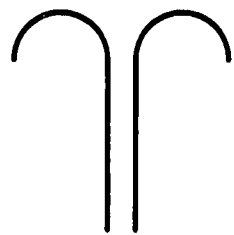
FIG. 14 shows a detailed view of a capillary extraction arrangement.

FIG. 14 shows an enlarged portion of the slots made by two ends of the "m"-shaped mini-channels. The slot has substantially parallel elongate sides and each side curves away from the other at the top. The rounded shape allows for easier access into the collection portion as water is extracted by capillary action through the width of the slots and deposited in the "U"-shaped bends of the "m"-shaped mini-channels. There is no need for the extraction portion 244 to slope as water cannot build up before it flows into the collection portion 242 of the unit 300.

The skilled person will realise that any of the described extraction methods and materials may be used with any of the water management units described herein.

Figure 15:
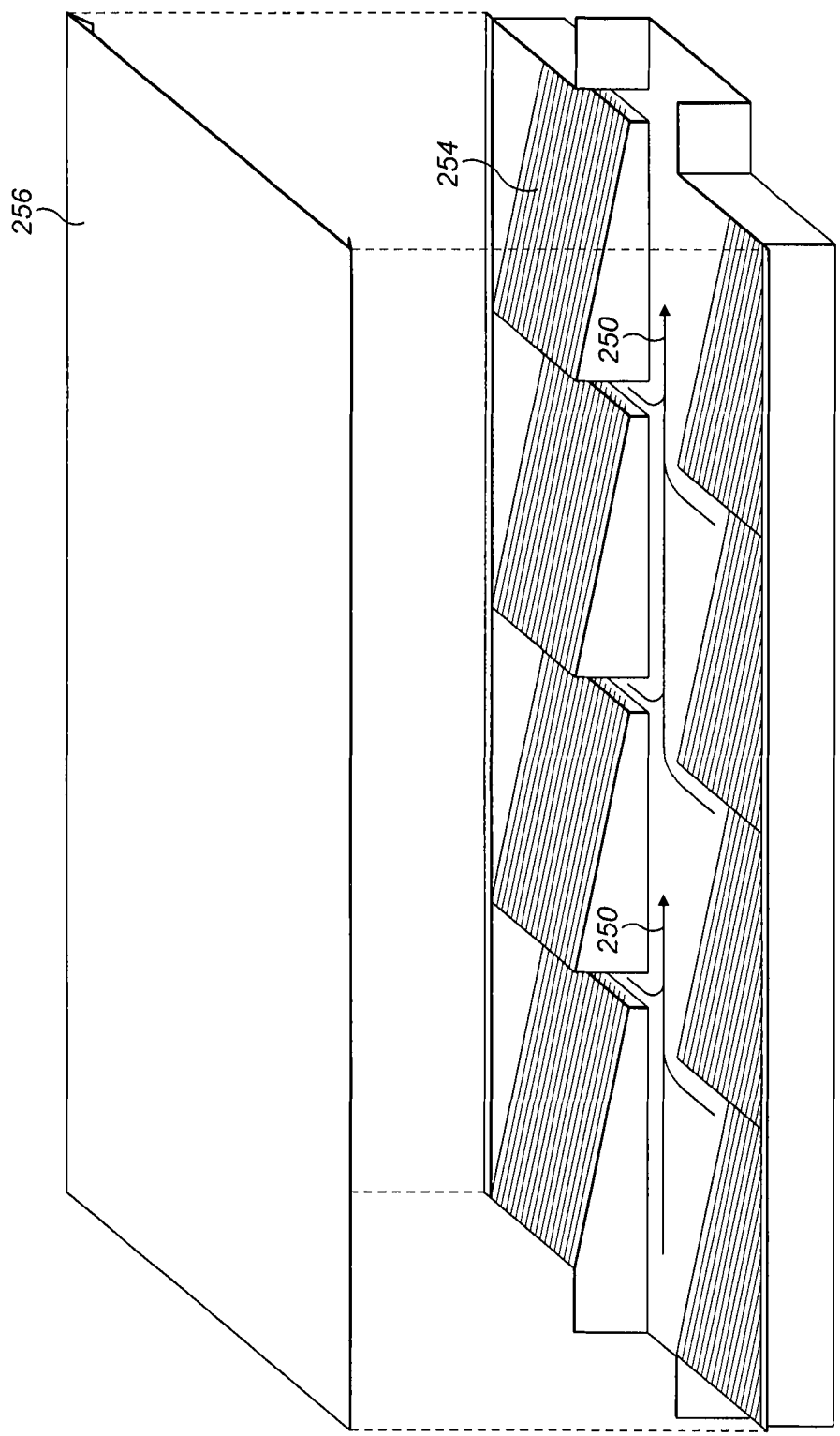
FIG. 15 shows a schematic diagram of a low profile water management unit.

Another embodiment is shown in FIG. 15 which has extraction portions 254. The extraction portion 254 comprises ribs with extraction material on the underside. The extraction material may be the extraction material as described in relation to any of the previous embodiments or any other suitable arrangement. The sloped extraction portions 254 discharge into a main water flow channel 250 along the length of the unit via a collection portion located between the sloped ribs. As with previous embodiments, water is collected from the soil from the underside of the sloped ribs and surrounding area and transferred to the inside of the unit via the extraction portion for transport and removal via the main water flow channel 250. In this embodiment a snap fit cover 256 is also provided in order to prevent soil particles from entering the unit.

Figure 16:
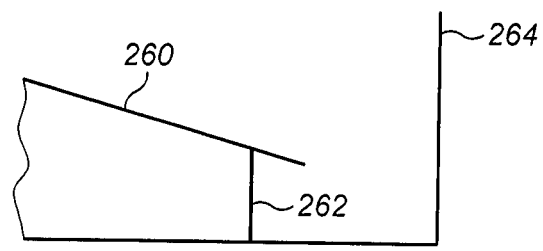
FIG. 16 shows a detailed view of the embodiment shown in FIG. 15.
Figure 17:
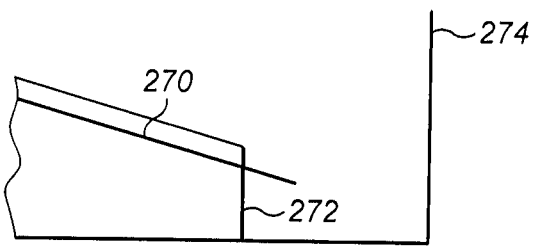
FIG. 17 shows an alternative arrangement to FIG. 16.

FIG. 16 shows a detail of the rib sections of the embodiment shown in FIG. 15. Extraction material 260 is located on the under side rib 262 and passes over the edge of the rib 262 so that water may be collected in the water management unit 264. Alternatively, as shown in FIG. 17, a slot may be cut in the rib 272 so that the extraction material 270 passes through the rib 272 for depositing water in the unit 274.

These low profile embodiments may be installed in an area needed to be drained without a trench, however, a trench will give better efficiency and performance. Generally, these embodiments have a profile where the water management unit is only 3 or 4 cms tall so they require a shallow trench and hence little excavation. Such a trench may easily be dug by hand and requires a minimal quantity of material for back filling. This results in substantial cost savings in both labour and materials. The unit may be made in any suitable length or width. For example, approximately 1m in length and 50 cm in width.

Figure 1:
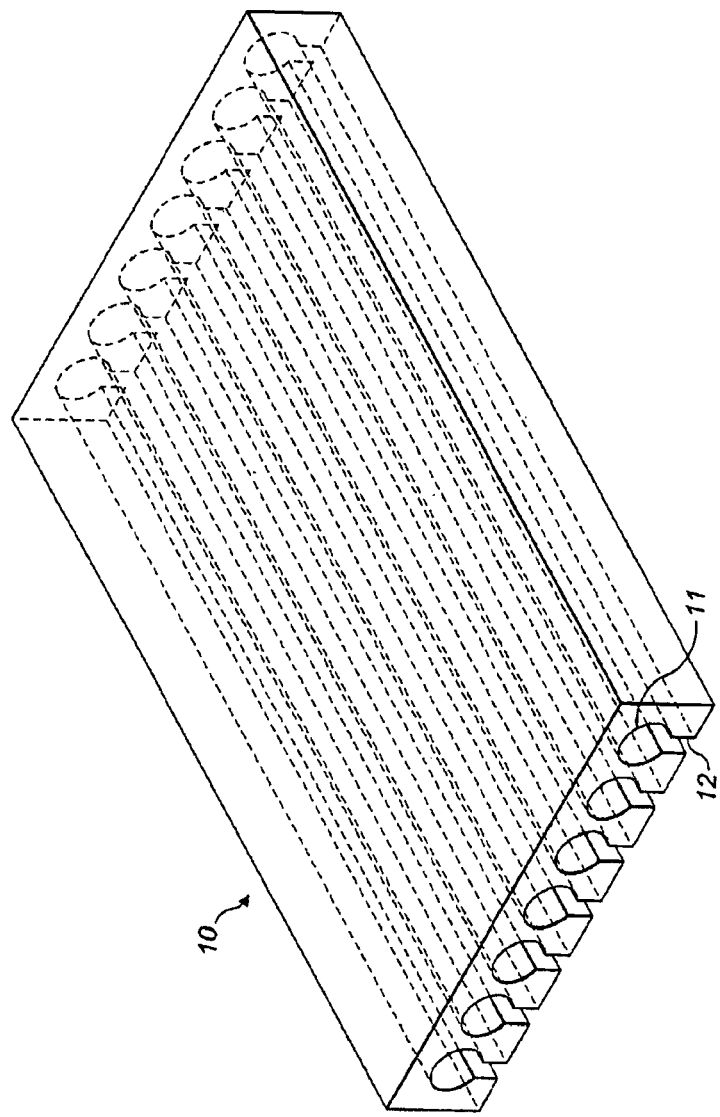
FIG. 1 shows a perspective schematic diagram of a drain belt.
Figure 2A:
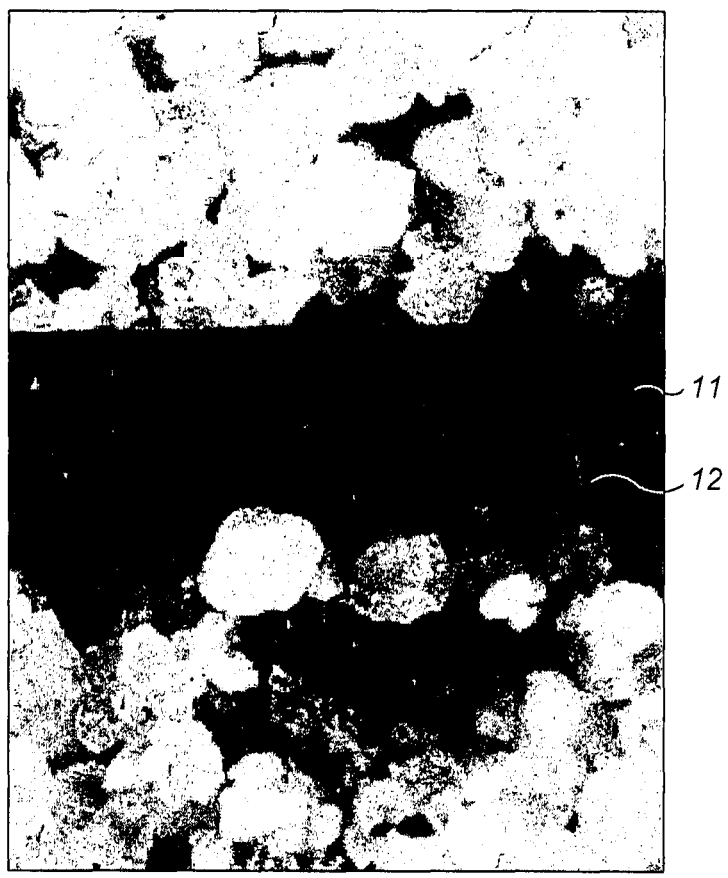
FIG. 2a shows a cross sectional view of a drain belt in dry soil.
Figure 2B:
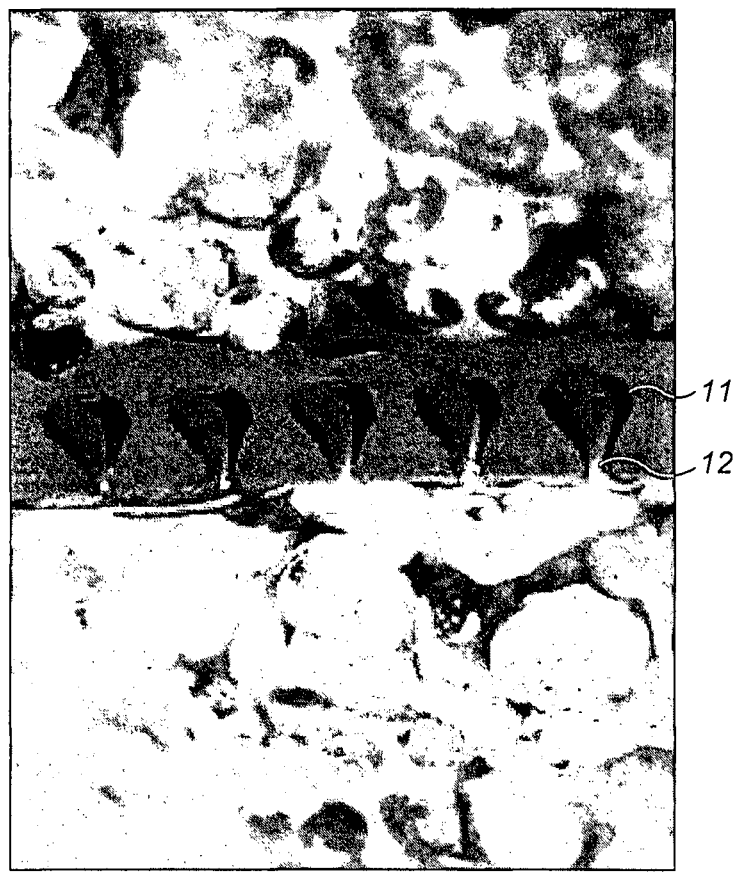
FIG. 2b shows a cross sectional view of a drain belt in saturated soil.
Figure 3:
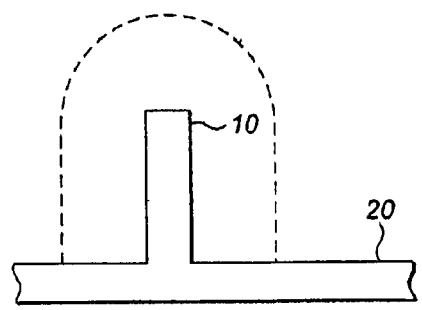
FIG. 3 shows a plan view of the collection area of the drain belt.
Figure 5A:
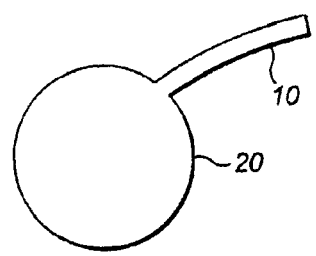
FIG. 5a shows a cross sectional view of a joint between a drain belt and a discharge pipe.
Figure 5B:
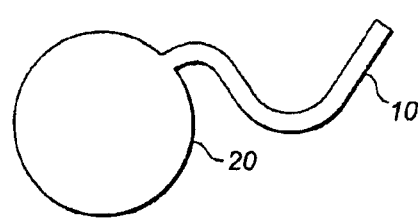
FIG. 5b shows a cross sectional view of a joint between a drain belt and a discharge pipe.
Figure 4:
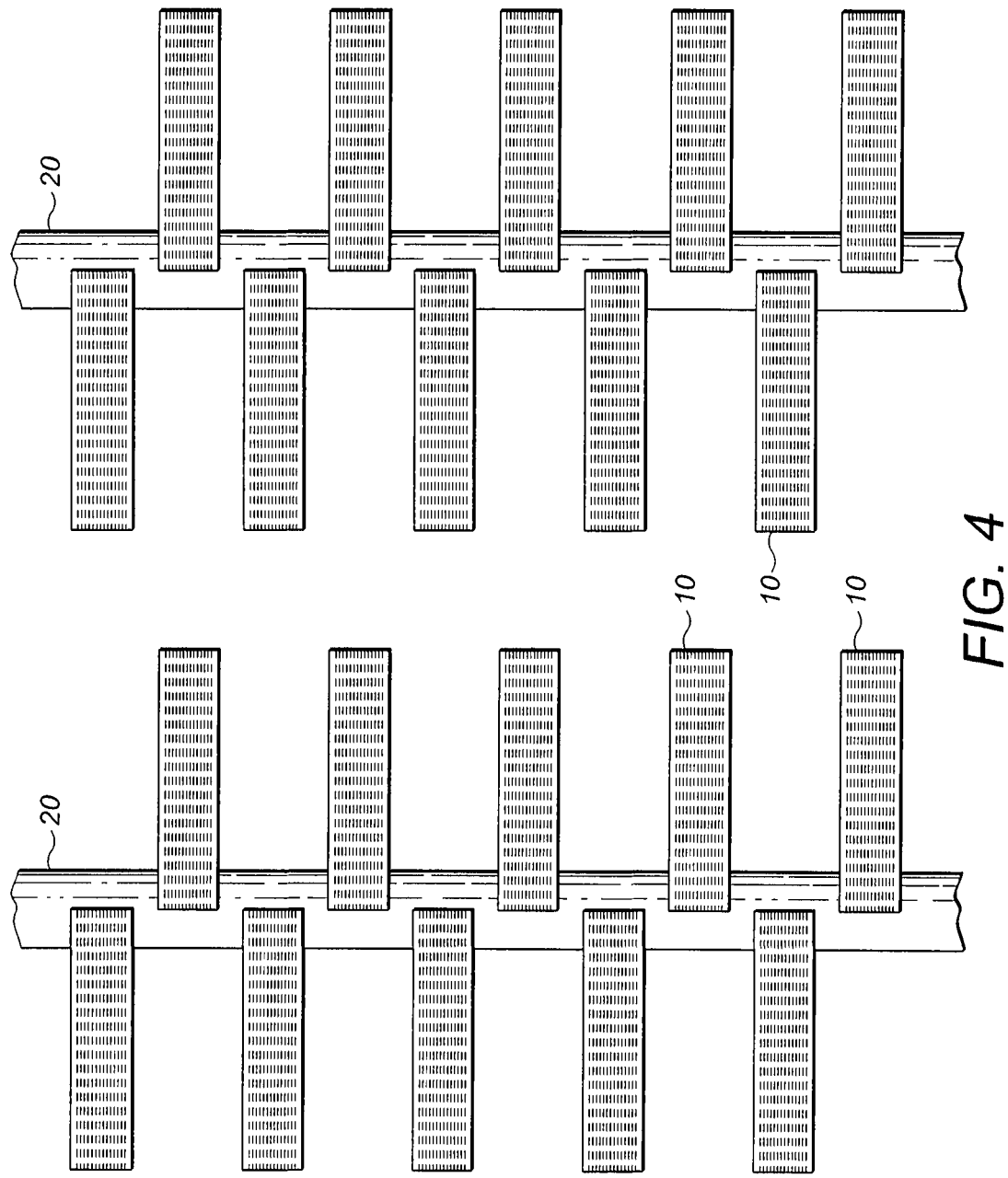
FIG. 4 shows a plan view of a drainage system that incorporates the drain belts.
Figure 6:
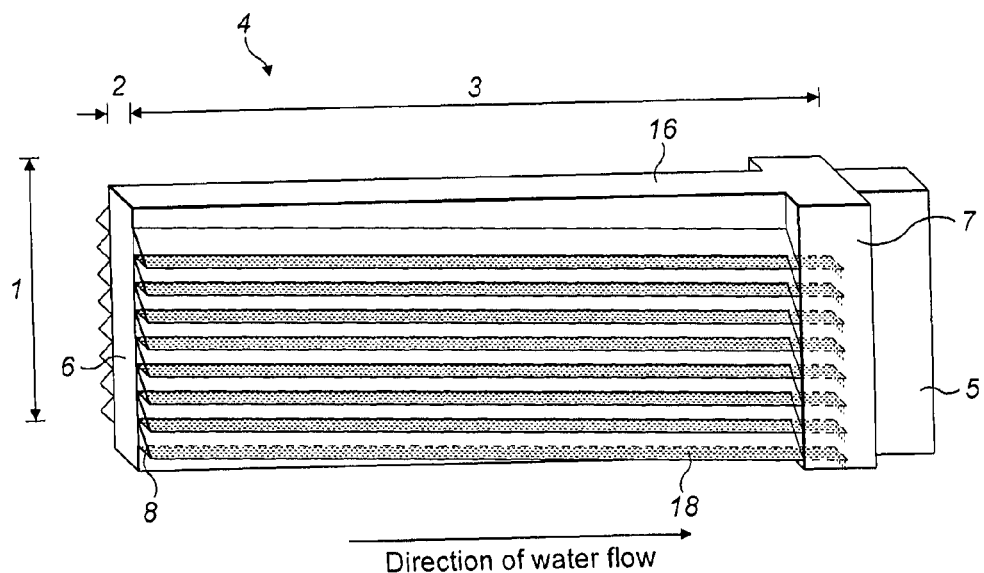
FIG. 6 shows a schematic diagram of a water management unit.

Another embodiment is shown in FIG. 6 which provides a schematic diagram of a water management unit 4. The water management unit 4 comprises an elongate collection portion 16 and an extraction portion 18. Extraction portions 18 may be located on one or more sides of the collection portion 16. The collection portion 16 has a plurality of ribs 8 located on the exterior which extract water from the surrounding area.

Water is extracted from the surrounding ground by the extraction portion 18 of the water management unit 4 and is made up of the plurality of ribs 8. The extracted water flows along the ribs 8 on the exterior of the collection portion 16. The collection portion 16 provides a conduit for extracted water. Water is transferred from the extraction portion 18 to the collection portion 16 and subsequently water is transferred to the drainage system.

The collection portion 16 has an upstream end 6, a downstream end 5 and in some embodiments it is generally rectangular and narrow in cross-sectional profile, elongate and T-shaped in plan view, the cross bar being at the downstream end 15. It has a box shape so that the ribs 8 may be conveniently located along the sides. When installed in saturated ground, water is extracted from the surrounding ground along the ribs 8 and flows along the ribs 8 into the collection portion 16 at the wider section 7.

The downstream end 5 of the collection portion 16 has a wider section 7. The end of the ribs 8 abut the collection portion 16 at the wider section 7, the cross-bar of the T-shape, and the ribs 8 are molded into the outer frame of the wider section 7, while the water extraction material 14 extends through the walls of the wider section 7 so water collected by the water extraction material 14 can be effectively transferred to the inside of the wider section 7 for removal by the collection portion 16.

Figure 7:
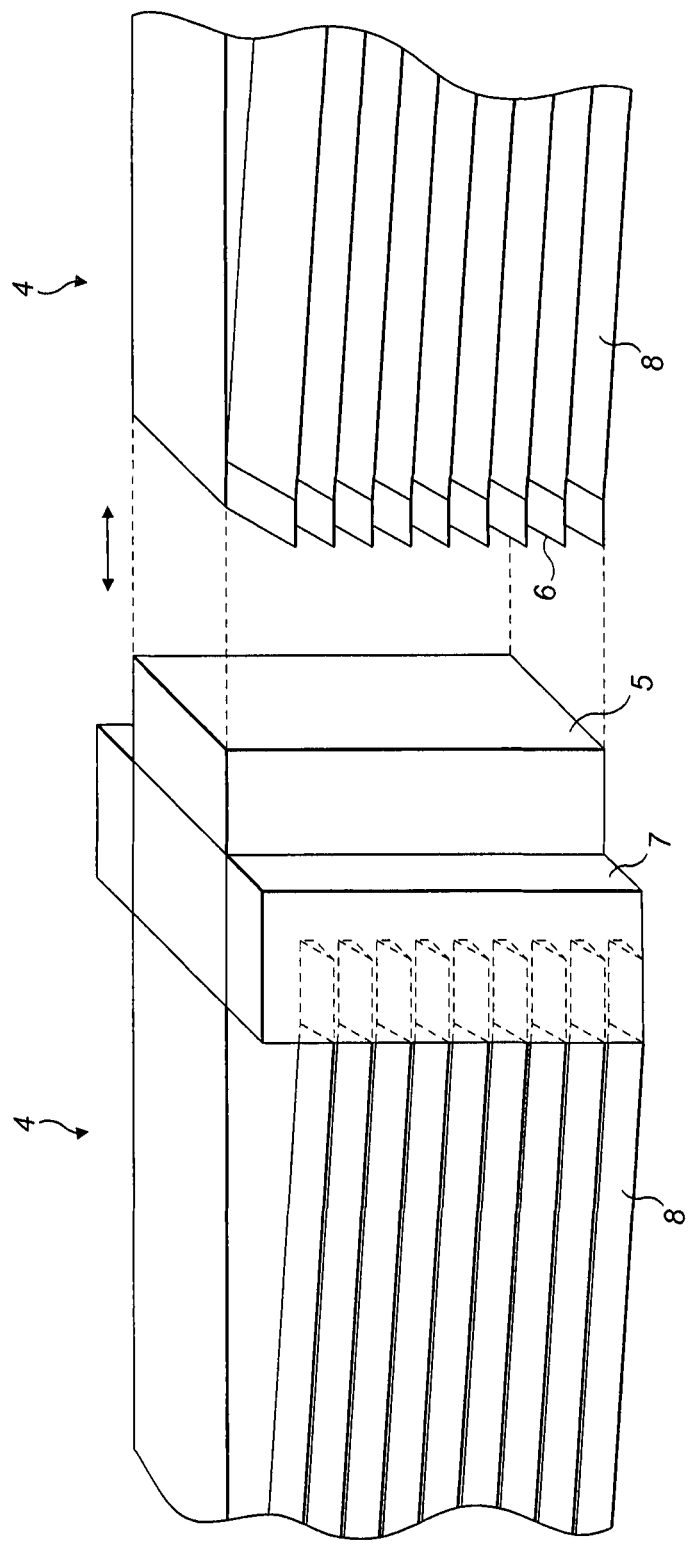
FIG. 7 shows a schematic diagram of two water management units.

Optionally, the downstream end 5 of the collection portion 16 is shaped so that it may cooperate with the upstream end 6 of an adjacent collection portion 16. The downstream end 5 of a first unit 4 may be inserted into the upstream end 6 of a second unit 4. Thus, several units 4 may be connected together to extract water over a larger area. FIG. 7 shows a schematic diagram of two water management units 4 fitted together. As can be seen, the downstream end 5 of the first unit 4 is sized and shaped so that it may be inserted into the upstream end 6 of the second unit 4.

The ends 5,6 of the unit 4 may alternatively be shaped to connect to a pipe 20 of a drainage system. Alternatively, the upstream end 6 of the unit 4 may be capped as a terminus of the drainage system. Thus, the unit 4 may be placed in any position within a drainage system, for example, next to another unit 4, at the end of pipe 20 branch, at any position along a length of pipe 20 or at a pipe junction.

Figure 8:
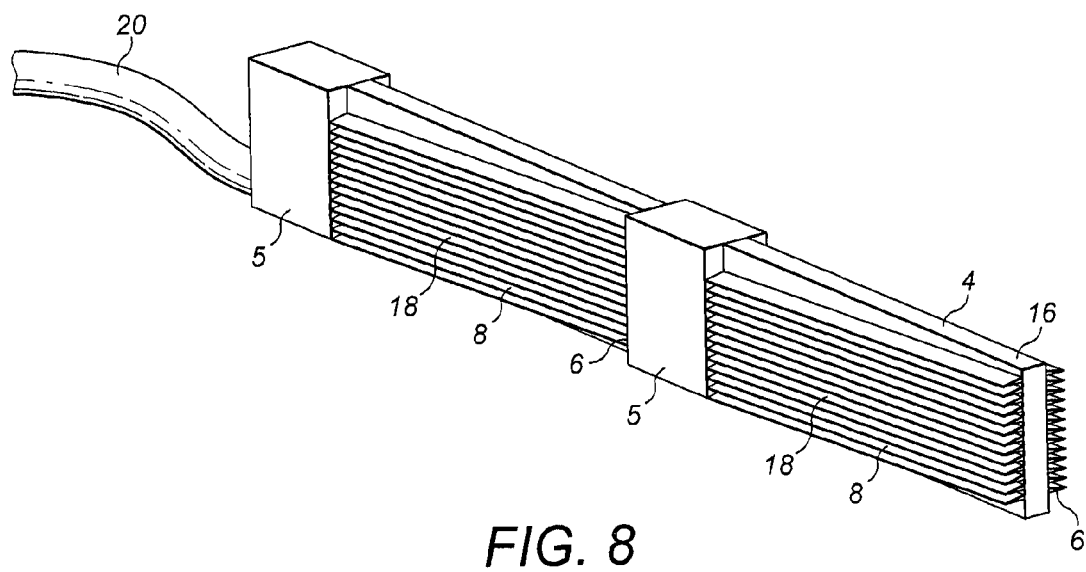
FIG. 8 shows two water management units connected to a pipe.

An example of a water management system is shown in FIG. 8 before it is inserted in the ground. Two units 4 are connected by their respective upstream 6 and downstream ends 5. The first unit 4 is also connected to a pipe 20 at the downstream end 5. The upstream end 6 of the second unit 4 is capped.

Although not shown in the drawings, the top and bottom of the collection portion 16 may also be shaped so that a first unit 4 cooperates with a second unit 4 such that the units 4 may be stacked vertically. For example, the units may be stacked, increasing the overall height of the system, for use against a retaining wall.

According to the example shown in FIG. 8, the unit 4 may have dimensions in the range of height of 10-40 cm, a width of 5-15 cm and a length of 20-60 cm; and the ribs are 1-5 cm wide. The width (not shown) between extraction portion 18 on either side of the collection portion 16 may be approximately 5 cm. However, any suitable dimensions may be used and the foregoing is merely a suggestion of suitable dimension.

Joints between units 4, pipes 20 and other parts of the drainage system are preferably such that water does not leak. For example, they might include rubber parts with interference fit ribs so that a seal is formed. However, even if some leakage between parts does occur, the water will be collected again by the extraction portion 18 of the unit 4.

Further, the unit 4 may have additional openings to connect with other parts of a drainage system. For example, a side or top opening may be suitable to form a connection with additional drain belts to increase the effective water collection area of the unit 4. Thus, the drain belts may drain into the collection portion 16 of a unit.

The water extraction portion 18 of the unit 4 comprises at least one rib 8 arranged along the length 3 (see FIG. 6) of the collection portion 16. Optionally there is a plurality of parallel ribs 8 arranged on the side of the collection portion 16. The ribs 8 are arranged along the length 3 of one or both vertical sides of the collection portion 16 and optionally slope down from the upstream end 6 of the collection portion 16 to the collection point at the wider point 7 of the collection portion 16 at the end of the ribs 8. At the downstream end of the ribs 8, they abut with the wider section 7 of the collection portion 16 where the ribs 8 are molded into the outer frame and the water extraction material 14 extends through the walls of the wider point 7 so extracted water is discharged into the collection portion 16.

Figure 9:
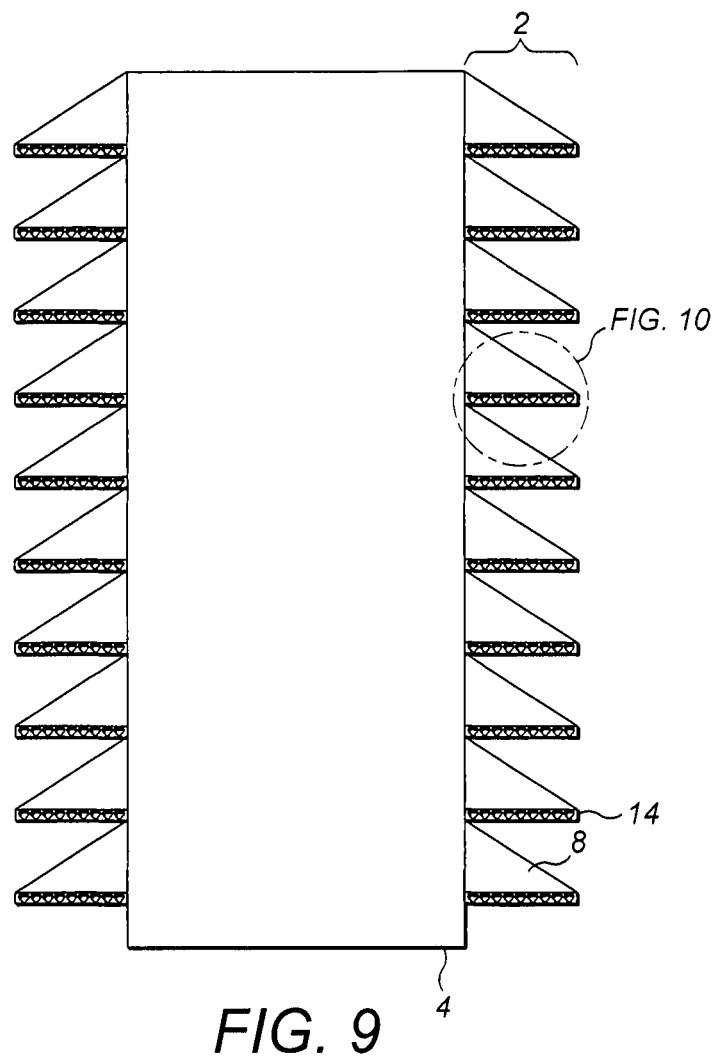
FIG. 9 shows a cross sectional view of a water management unit.

Referring to FIG. 9, a formation or water extraction material 14, of the type described above, is located on the bottom of the ribs 8. The water extraction material 14 is a plurality of slots 12 which extend along the length of the rib 8. Each slot 12 has a corresponding notch 11 extending into the rib. The channels 11 are wider than the slots 12 to hold water in the material 14. The slots 12 and channels 11 are sized so that water is extracted from the surrounding area by being drawn up into the channels 11 through the slots 12 by capillary action. Water extracted from the surrounding area can flow along the channels 11. At the downstream end of the rib 8, the end of the water extraction material 14 is open so that water can flow out of the channels 11.

The ribs 8 may be level or at any angle along the side of the collection portion 16. Where the ribs 8 are sloped downward from the upstream end 6 to the downstream end 5, water flows along the channels 11 into the collection portion 16 under gravity. Water pressure may be enough that water will flow along the ribs 8 even when, when installed, there is no overall downward slope of the extraction portion 18.

Conveniently, the slope will be such that a plurality of ribs 8 can be arranged on one side of the collection portion 16 and so that they provide sufficient flow of water. For example the slope may be in the range of 2°-30°, preferably in the range of 5°-20° and more preferably 15°.

Installation of units 4 may be in a level trench. In some embodiments, the slope of the ribs 8 therefore provides a built-in downward slope in the extraction portion 18 from the upstream end 6 to the downstream end 5 so that water may be collected and taken away by the drainage network. The slope of the ribs 8 is independent to the slope of the network.

Further, the slope of the ribs 8 may be such that where the unit 4 is installed in a trench that does not have a level base, e.g. where the section of the trench is sloping up from the upstream end to the downstream end of the system, the slope of the ribs 8 is sufficient to compensate for a negative slope of the installation trench. Due to the slope of the ribs 8 on the collection unit 4, sloping of the trench for installation is not critical and therefore it is much easier to install the water management unit 4 so that it is effective in use because the slope of the ribs 8 gives the unit 4 a greater tolerance.

Again referring to FIG. 6, the ribs 8 are located along the length 3 of the water management unit 4 and extend laterally from the side of the unit 4. The width 2 of the ribs is not critical. However, the dimension will be chosen to keep the overall profile of the unit 4 narrow and to provide the desired extraction capacity. Suitable dimensions have been given above. However, the person skilled in the art will appreciate that these are not limiting.

Figure 10:
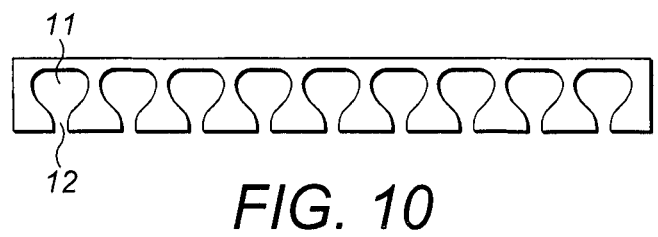
FIG. 10 shows a cross sectional view of an extraction formation.

FIG. 9 shows a cross section view of a water management unit 4. Ribs 8 extend laterally from the side of the collection portion 16. The ribs 8 have a triangular cross-section with a downwardly angled top surface and water extraction material 14 on the generally horizontal bottom of each rib 8. FIG. 10 shows an expanded view of the water extraction material 14. Similarly to the drain belt 10, the material has slots 12 and channels 11 which extract water by capillary action.

Optionally, the ribs 8 have triangular cross-section, with the water extraction material 14 on the bottom side of the triangle. The cross-section of the ribs 8 provides increased rigidity to the extraction portion 18 so that the extraction material 14 remains in place and facing down when installed and during compaction of the backfill. The ribs 8 may also provide increased rigidity to the collection portion. During installation the slope on the upper surface of the ribs 8 helps to deflect soil particles from the extraction material 14 so that there is less risk of small particles entering the slots 12 and clogging the water flow path.

Where a plurality of ribs 8 are located on the side of the collection portion 16, the result is effectively a separated stack of thin strips of extraction material 14.

Therefore, the effective width of the extraction material 14 is large enough to provide enough water extraction capacity, while maintaining a narrow profile of the unit. Further, the extraction capacity is increased as the total effective width of the extraction material is increased or the height of the water management unit 4 is increased.

The maximum distance that water has to flow along the ribs 8 to the discharge point in the collection portion 16 is limited by the length 3 of the collection portion 16. The strips of extraction material 14 are limited in length to the length of the rib 8 on the collection portion 16. Strips of extraction material 14 are thus preferably short enough that the flow of water through the channels 11 is not significantly impeded by resistance from the small size of the channels 11, and optimally, the water flow and discharge will match the extraction capacity of the extraction material 14.

If a greater length of water extraction is required along a greater length, several units 4 may be joined together, as described above. Along the length of the water extraction units 4, water will be collected regularly into the collection portion of the units 4. The collection portion 16 is large enough that it does not fill and prevent water from being extracted. Therefore, it is possible to extract water at rates as great as 20 lt per minute per meter in course sand, the limiting factor being the hydraulic conductivity of the sand, with a relatively small and narrow water management unit 4.

The narrow profile makes installation of the unit 4 in the ground straightforward. A narrow profile allows for minimal disruption of the ground as one or more units 4 may be inserted in a trench which is only slightly wider than a unit 4 and connected to other units 4 or pipes 20. The trench is then backfilled with the excavated soil or with sand with out the need for accurate positioning in view of the rigidity and inherent angle of the ribs. As will be apparent from the foregoing, the water management unit 4 is simple to install. In most embodiments the unit 4 will have a narrow profile. Further, as the ribs 8 do not extend from the unit 4 by a great distance, there is no need to excavate a wide area to accommodate the extraction portion 18. The unit 4 can be installed in a trench which is approximately the same size as the drain pipe 20 trench.

Since the strips of extraction material 14 are oriented one above the other, for the height of the water management unit 4, and the water management unit 4 is placed into the narrow trench with the strips of extraction material 14 facing down, in the opposite direction of the backfill sand, it is not probable that the extraction material 14 can be clogged from pressure on the surface, or foot traffic, or backfill operations.

Preparation of the trench is also simpler than for other drainage or water management systems. As a slope in the extraction portion 18 is built into the unit 4, it is not necessary to ensure that the trench is sloped in a downward direction from the upstream end of the unit 4. Normally, the unit 4 will be installed in a trench with a slight slope to drain the collection portion 16, but can be installed in a level trench since the height of the unit 4 will allow for substantial drainage of the collection portion 16, while the extraction portion 18 is sloped independent of the trench slope.

Indeed, it is possible that the slope of the extraction portion 18 of the unit will be sufficient even if the unit 4 is installed on a positive slope i.e. the trench slopes upwards from the downstream end 5 of the unit 4, the unit 4 will still be able to extract water and deliver water into the collection portion 16 of the unit 4.

The ends of the unit 4 are either capped or connected to pipes 20 in the drainage system. The units 4 may also be installed adjacent to each other along the trench. Once in place, the trench is backfilled using either the excavated soil, sand or other material. It is not necessary to use drain rock as a filter, as required by more conventional systems, since the soil particles are separated from the water by gravity before the water enters the water extraction material 14 by capillary action.

Further, it is not necessary to carefully compact the soil around the unit 4 because the joints between the extraction portion 18 and the collection portion 16 are fixed by the unit 4 itself, and the ribs 8 provide elongate rigidity. Therefore, faults arising from installation are unlikely.

As will be apparent, the unit 4 is suitable for use in a number of situations where water management is required. For example, it may be installed at a number of locations for managing water in a playing field, or, next to a retaining wall. In the situation where the unit is used directly next to a retaining wall, the ribs 8 may be located on just one side of the collection portion 16.

As after installation the operation of the unit 4 does not depend on whether the ground around the installation has settled, small ground movement will not effect the collection of water. Further, even if the ground below the installation settles so that the unit 4 is no longer level, as noted above, the unit 4 will continue to operate in the desired way because the tolerance of the unit 4 is large enough that it may work.

Further, the design of the unit 4 is such that it is very unlikely that soil particles will enter the water extraction material 14 and the collection portion 16. Therefore, it is unlikely that the water flow path will become clogged. This means that after installation, the unit 4 will continue to operate without the need for maintenance. This represents a significant advantage, as when a drainage system is installed in the ground, there is very limited access to it without re-excavating the area.

The unit 4 can be manufactured using a durable semi-rigid material, such as plastic. The unit may be manufactured by constructing several parts, or in a single part process with all of the different features integrated in a single part.

Collected water may be re-used or channelled so that it may be stored for other purposes. The unit 4 may alternatively be used for water irrigation systems. In this instance the ribs 8 would slope downwards from the openings in the collection portion 16 and water would flow from the collection portion 16 to the extraction portion 18.

Embodiments of the invention have been described by way of example only. It will be appreciated that variation of the described embodiments may be made which are still within the scope of the invention.

For example, the dimensions of the collection portion may be varied. Any suitable shape of the collection portion 16 may be envisaged. Also, the width and number of the ribs may be varied. The unit may be constructed and fabricated from any suitable material.

The invention claimed is:

1. A water management unit comprising:
an elongate collection portion; and
an extraction portion arranged to discharge extracted water into the collection portion,
wherein the extraction portion comprises at least one rib extending laterally from the collection portion along a length of the collection portion; and
wherein the extraction portion further comprises a water extraction formation arranged to extract water by capillary action, the water extraction formation being located on an underside of the at least one rib, and wherein the water extraction formation includes a plurality of parallel rods spaced apart for capillary action water extraction.

2. A water management unit according to claim 1 wherein the plurality of parallel rods are arranged in one or more layers.

3. A water management unit according to claim 2 wherein the layers are orientated such that the plurality of parallel rods in the layers are parallel or non-parallel relative to the plurality of parallel rods in other layers.

4. A water management unit according to claim 1, wherein the water extraction portion is interrupted along its length to communicate with the collection portion, and wherein adjacent interrupted portions are substantially parallel, and wherein adjacent interrupted portions have surfaces sloped in opposing directions.

5. A water management unit according to claim 1, wherein the at least one rib extends the length of the collection portion and/or wherein the at least one rib has a plurality of parallel ribs arranged on at least one side of the unit.

6. A water management unit according to claim 1, further comprising a cover, and wherein the cover includes plastic or geotextile.

7. A water management unit according to claim 1, wherein an upstream end of the unit is shaped to cooperate with a downstream end of a second unit, and wherein the unit is adapted to connect to interlocking fittings of drainage systems, and wherein the unit includes a semi-rigid material or plastic.

8. A water management unit according to claim 1, wherein the water extraction formation has a plurality of channels for water to flow along.

9. A water management unit according to claim 1, wherein the at least one rib slopes in a downward direction from an upstream end of the unit.

10. A water management unit according to claim 1, wherein the at least one rib has a triangular cross section where the upper surface is angled and the underside is approximately horizontal.

11. A water management unit according to claim 1, wherein an upper surface of the unit is shaped to cooperate with a lower surface of a second unit.

12. A water management unit according to claim 1, wherein the unit is manufactured in a moulding process as a single part.

13. A water management unit according to claim 1, wherein at least one rib is oriented to provide a slope into the collection portion independently of any slope present in the collection portion.

14. A water management system comprising at least one water management unit according to claim 1 and a discharge pipe located downstream of the at least one unit.

15. A water management system comprising a plurality of connected water management units according to claim 1, and wherein the plurality of units are connected horizontally with an upstream end of a first unit connected to a downstream end of a second unit and/or wherein the plurality of units are connected by vertically stacking.

* * * * *